(12) United States Patent
Santini

(10) Patent No.: US 6,513,227 B2
(45) Date of Patent: Feb. 4, 2003

(54) METHOD FOR MEASURING FINE STRUCTURE DIMENSIONS DURING MANUFACTURING OF MAGNETIC TRANSDUCERS

(75) Inventor: Hugo Santini, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 09/758,304

(22) Filed: Jan. 10, 2001

(65) Prior Publication Data

US 2002/0088109 A1 Jul. 11, 2002

(51) Int. Cl.$^7$ .............................................. G11B 5/127
(52) U.S. Cl. .................... 29/603.09; 324/210; 324/252; 366/128
(58) Field of Search ........................ 29/603.07, 603.09; 360/120, 128; 324/210, 252

(56) References Cited

U.S. PATENT DOCUMENTS 5,996,213 A * 12/1999 Shen et al. .............. 29/603.07
6,111,724 A     8/2000 Santini
6,370,763 B1 *  4/2002 Watanuki et al. ........ 29/603.09

* cited by examiner

Primary Examiner—P. W. Echols
(74) Attorney, Agent, or Firm—G. Marlin Knight

(57) ABSTRACT

A method for forming metrology structures on a wafer on which magnetic transducers are being fabricated is disclosed. The metrology structures have a measurable electrical resistance which is an accurate surrogate for a physical dimension of a structure of the magnetic transducer, such as a pole piece tip. The metrology structure is preferably a resistor with pads usable with a four point probe. The resistor is preferably formed by creating a sacrificial pole piece structure over a pad of resistive material. The narrow dimension of the pole tip is then used as a mask to replicate the width of the pole tip in the resistive material through a milling process which removes resistive material outside of the masked area of the resistor pad. Control structures with unmilled pads of resistive material are formed along with the metrology structures to provide the sheet resistance of the pads prior to milling. Knowledge of the sheet resistance allows the resistance of the milled structure to be converted into an accurate measure of the physical dimension of the pole piece tip.

22 Claims, 4 Drawing Sheets

METHOD FOR MEASURING FINE STRUCTURE DIMENSIONS DURING MANUFACTURING OF MAGNETIC TRANSDUCERS

FIELD OF THE INVENTION

The invention relates to the field of manufacturing methods for magnetic transducers (heads) and more particularly to methods and structures for monitoring the results of a manufacturing process for producing fine structures used as pole tips in magnetic transducers.

BACKGROUND OF THE INVENTION

A typical prior art magnetic head and disk system is illustrated in FIG. 1. In operation the head 10 is supported by a suspension 13 as it flies above the disk 16. The magnetic transducer, usually called a "head," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension arm (not shown). Typically there are two electrical leads each for the read and write heads. Wires or leads are connected to these pads and routed in the suspension 13 to the arm electronics (not shown). The disk 16 is attached to spindle 18 that is driven by a spindle motor 24 to rotate the disk. The disk 16 comprises a substrate 26 on which a plurality of thin films 21 are deposited. The thin films include ferromagnetic material that is used to record the magnetic transitions in which information is encoded.

The write head 23 portion of the transducer typically includes two pole pieces (P1 and P2 formed from ferromagnetic material) (not shown) and a coil (not shown). To decrease the side writing and, therefore, to reduce the track width the pole pieces are shaped into narrow tips at the gap. In a typical prior art method P1 is deposited first and initially has a broad, flat tip that is subsequently ion milled (sometimes called "notching") using the P2 tip as a mask to form the P1 tip. This process insures that P1 and P2 have a closely matched tip size. U.S. Pat. No. 6,111,724 to Hugo Santini discusses a prior art process for making P2 tips and describes an improvement using a zero-throat-height defining layer.

Regardless of the method used to form P2, the width of the track written by this type of inductive head is largely determined by the width of the bottom of P2 (P2b). P2 tends to be wider at the top (away from the gap) which creates an additional complication in measuring the width of P2b. It is important to be able to measure P2b with some precision to monitor the manufacturing process. There are numerous variables in the process which affect the formation and shape of P2 including those affecting the photolithography used to define the shapes, the plating process used for depositing the ferromagnetic material, the seed layer removal process and the ion milling used to shape P1 using P2 as a mask. These variables can change from time to time in the manufacturing process and may even vary across a single wafer.

Thus, there is a need for an efficient method of measuring the width of P2b from wafer to wafer and also across each wafer.

SUMMARY OF THE INVENTION

Applicant discloses a method for forming metrology structures on a wafer, on which magnetic transducers are being fabricated, which have a measurable electrical resistance which is an accurate surrogate for a physical dimension of the nearby P2 tip structures formed on the wafer for the magnetic transducers. The metrological structure of the invention is formed in parallel with and proximate to the production P2 structure to subject the metrology structure to the same local process variables affecting the P2 production structure, including those which result in the bottom being narrower than the top. The metrology structure is preferably a resistor with pads which are usable with a four point probe. The resistor is preferably formed by creating a sacrificial P2 structure over a pad of millable resistive material. A selected area of the P2 structure is used as a milling mask to replicate the width of the selected area in the resistive material. The selected area should include the narrowest area of P2. Preferably an ion milling process is used to remove the resistive material outside of the masked area of the resistor pad, thus replicating the width of P2 in the resistive material. Since the resistor pad is under P2, it is milled down to the width of the bottom of P2, i.e., P2b. Control structures with unmilled pads of resistive material (sheet resistors) are formed along with the metrology structures to provide the sheet resistance of the pads prior to milling. Knowledge of the sheet resistance allows the resistance of the milled structure to be converted into an accurate measure of the physical dimension.

The metrological structure of the invention provides a way to measure the width in a more convenient way than is available in the prior art. In addition, since ion milling of the P1 tip using the P2 tip as a mask is already a typical part of the prior art process of manufacturing transducers, the metrology structure can be milled at the same time and in the same way.

DETAILED DESCRIPTION OF THE INVENTION AND THE PREFERRED EMBODIMENTS

It is conventional for thousands of heads to be manufactured simultaneously on a single wafer. The heads are eventually sawed into individual components. For simplicity the following will describe the actions or structures for a single metrology structure or sheet resistor, but it is to be understood that the actions such as layer deposition are performed over the entire wafer and are, therefore, forming structures for thousands of heads, sheet resistors and metrology structures simultaneously.

Figure 1:
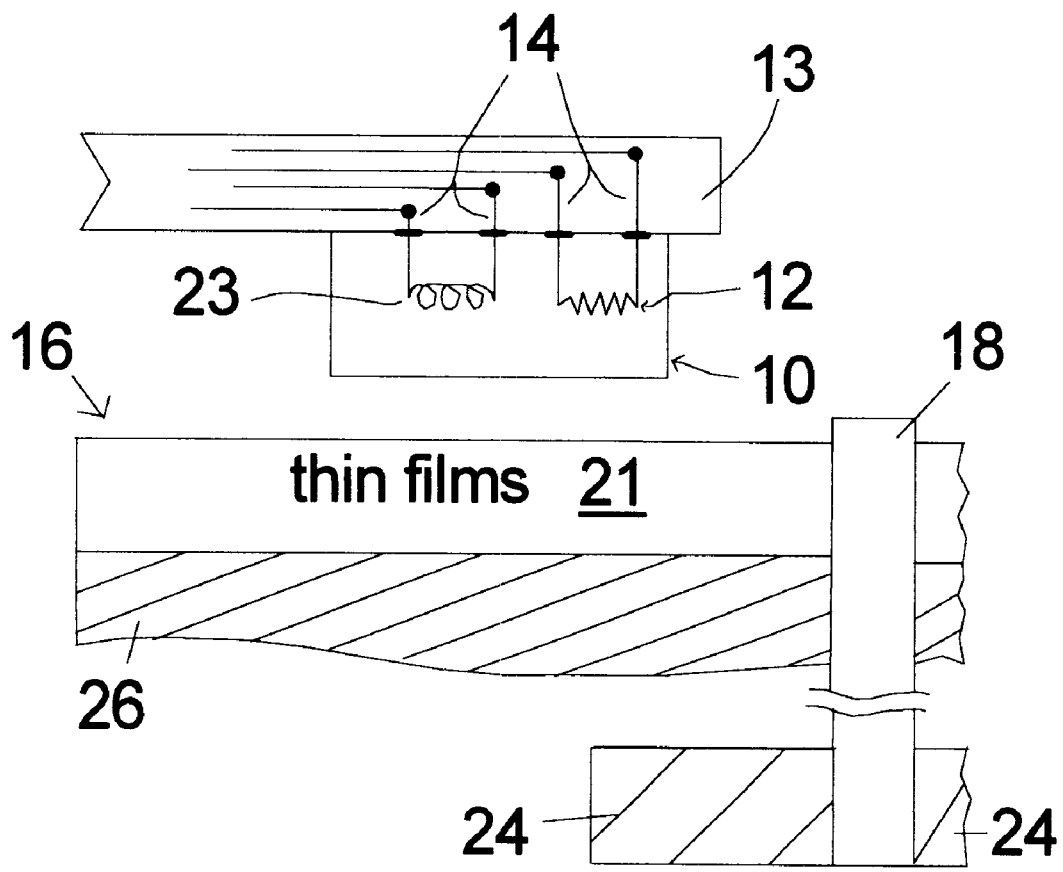
FIG. 1 is an illustration of the prior art showing the relationships between the head and selected associated components in a disk drive.
Figure 2A:
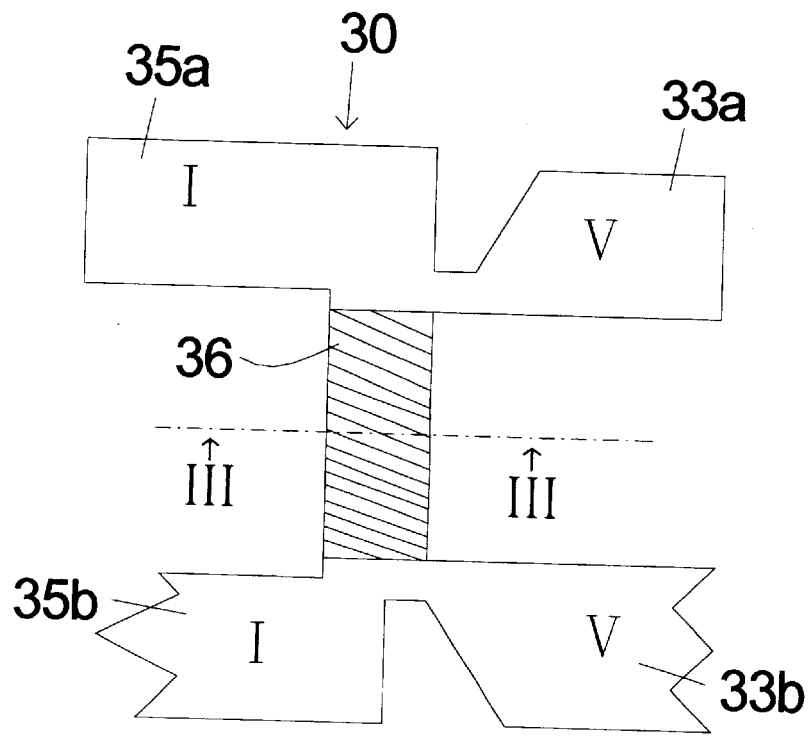
FIG. 2A is a plan view of a sheet resistor according to the invention.

FIG. 2A illustrates a plan view of a single sheet resistor 30 according to the invention. The four probe points include two leads/pads for voltage 33a, 33b for and two for current 35a, 35b. The leads/pads 33a, 33b, 35a, 35b are formed from standard conductive materials such as gold or copper and may include vias connecting the pads to the unmilled resistor 36 at a lower level in the wafer as in standard integrated circuit wiring. The sheet resistors 30 provide a way to measure the sheet resistance of the resistor material as actually deposited. Preferably there will be an equal number of sheet resistors 30 and metrology structures 31, but other ratios may be used. Equal numbers of metrology structures 31 and sheet resistors 30 can conveniently be formed using an even and odd row scheme where, for example, the even rows have the sheet resistors.

Figure 2B:
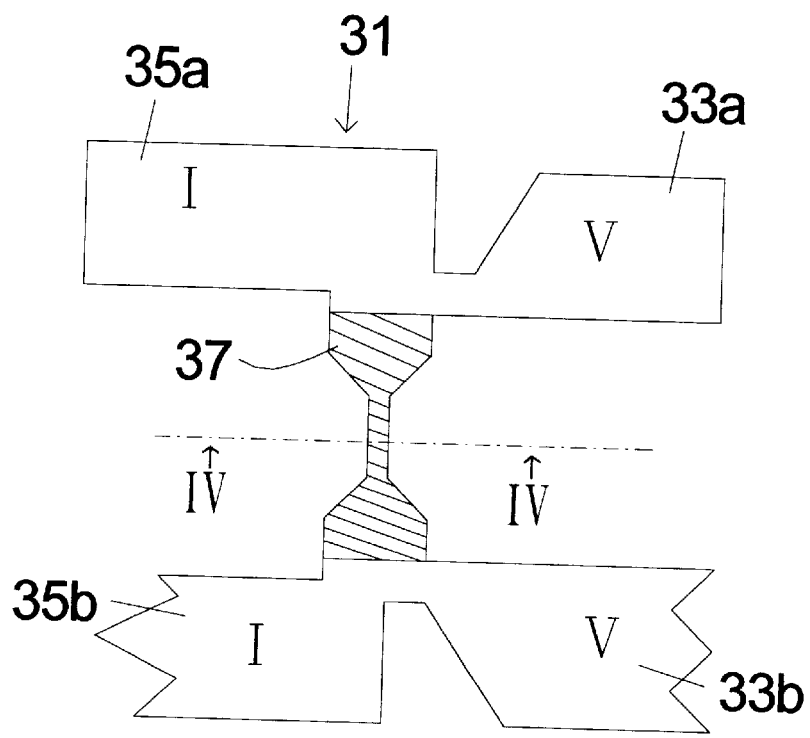
FIG. 2B is a plan view of a metrology structure according to the invention.

FIG. 2B illustrates a plan view of a single metrology structure 31 according to the invention. The metrology structure 31 is formed from a sheet resistor 30 and, therefore, has the same leads/pads for voltage 33a, 33b and current 35a, 35b. The dumbbell shaped central feature of metrology structure 31 is the milled resistor 37. The narrow portion is the same width as the bottom of the P2 tip used to form it. Since the ends of the resistor 37 are preferably left unmilled, the final shape has ends which are wider than the narrow central area or "neck."

The metrology structures 30 and sheet resistors 31 are preferably formed in the saw kerfs on the wafer, so that no wafer area is taken away from production. A metrology structure 31 or a sheet resistor 30 can be formed between every pair of heads.

Figure 3:
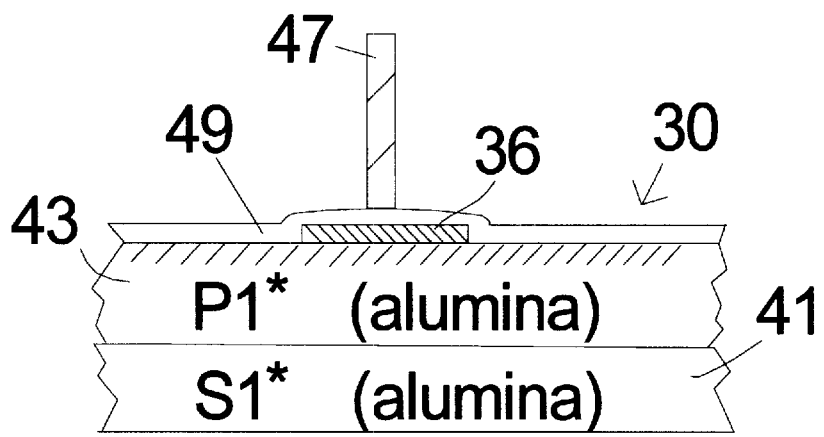
FIG. 3 illustrates a section view, taken along the line III shown in FIG. 2A, of the layers during the fabrication process of the metrology structure according to the invention.

FIG. 3 shows an illustration of a section of the sheet resistor 30 of FIG. 2A taken along the III—III line after the gap layer 49 has been deposited and the P2 tip 47 has been formed as a part of the fabrication process for converting a sheet resistor 30 into a metrology structure 31. (Note that the sheet resistors 30 which are to be left as control structures need not have the P2 tip 47 formed over them.) The relative thickness of the resistive material 36 has been exaggerated for clarity. The sheet resistor 30 includes a layer S1*41 of material (such as alumina) which is used as a place holder for the ferromagnetic SI layer in the transducer (not shown). Similarly, a P1*43 layer of nonconductive material is used to place hold for the P1 layer (not shown). The P1*and S1*layers allow the planarizations which are part of the standard processing of the wafer to work seamlessly with the fabrication of the sheet resistors 30. The pad of resistive material 36 is formed on P1*using standard liftoff techniques.

The resistive material can be any material which is normally used for thin film resistors which will survive the subsequent processing. Tantalum is preferable, since it is not etched by the permalloy etchant typically used to remove the excess P2 field material in a subsequent process step. The shape of the initial resistor pad 36 is not critical. The absolute thickness is likewise not critical. The sheet resistors 30 provide a control which eliminates the need to know the thickness of the resistor material in advance. If the sheet resistors 30 are formed in sufficient numbers across the wafer (not shown), it is also possible to control for variations in the thickness across the wafer.

The standard gap layer 49 is deposited over the entire wafer (not shown) at this point. The P2 tip 47 is formed over the resistor pad 36 using the selected production process. Any method of forming the P2 tip 47 can be used with the metrology structure 31 of the invention as long as the resistor pad 36 and its leads 33a, 33b, 35a, 35b are not damaged. The P2 tip 47 used for the metrology structure 31 should be formed using the same masks, etc., used for the production P2 tip (not shown).

Figure 4:
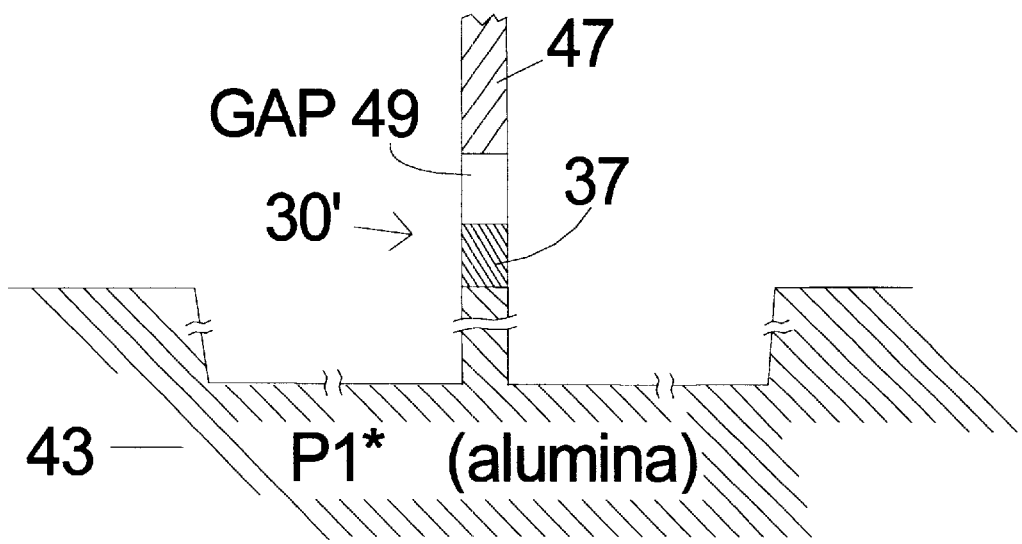
FIG. 4 illustrates a section view, taken along the line IV shown in FIG. 2B, of the layers during the fabrication process of the metrology structure according to the invention, subsequent to that shown in FIG. 3, after the resistive material has been milled.

FIG. 4 illustrates an enlarged view of the section of the intermediate metrology structure 30' taken along line IV in FIG. 2B. At this point the initial resistor pad 36 has been milled to form the resistor 37 of the metrology structure 31. Ion milling using the P2 tip as a mask is a prior art method of forming/trimming the P1 tip (not shown). Preferably the metrology structure 31 is milled at the same time as the P1 tip (not shown). When ion milling is performed on the structure of FIG. 3, the gap layer 49 and any remaining seed layer (not shown) used in the P2 plating process are milled away around the sides of the P2 tip 47. Once the gap layer 49 is removed the resistive material is milled away to form a precise "shadow" of the bottom of the P2 tip which replicates the effects of the local process parameters. Therefore, a metrology structure 31 formed along with the P2 tip 47 on an outer edge of the wafer may be significantly different than one in the center. This degree of detail provides the process engineer with valuable information in a more convenient and efficient manner than is available using the prior art. In FIG. 4 the milling has been continued long enough to mill away some of the surface of P1*43 which in the production process is referred to as P1 notching. Since the P1*is an insulator, notching has no effect on metrology structure. The requirement for the metrology structure 31 to function properly is only for the excess resistive material to be cleanly removed.

The leads and pads 33a, 33b, 35a, 35b for the four probe points are formed using prior art techniques. The protective coatings of alumina and/or photoresist (not shown) which are normally used to protect features during ion milling can also conveniently be used to protect the lead structures for the resistor, as well as, the immediately adjacent areas of the resistor which should not be milled.

Figure 5:
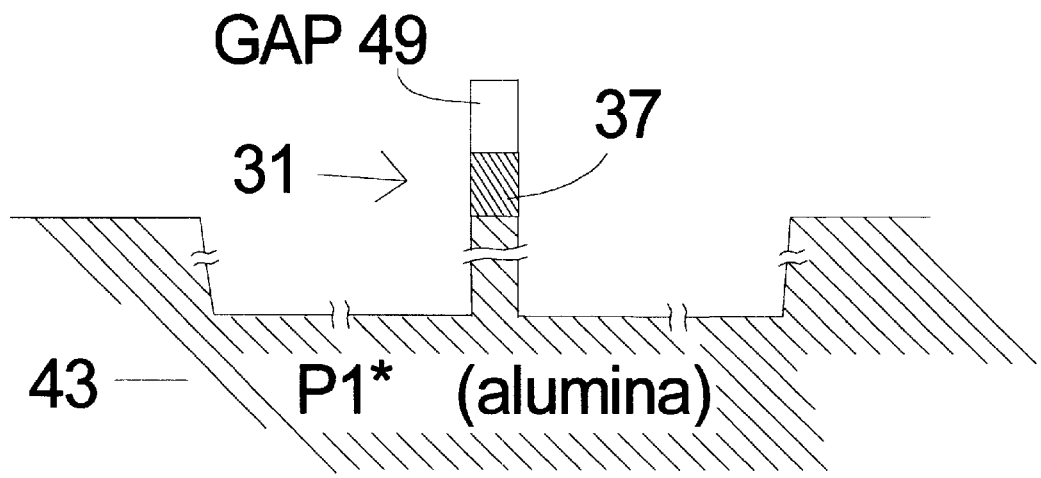
FIG. 5 illustrates a section of the layers during the fabrication process of the metrology structure according to the invention, subsequent to that shown in FIG. 4, after the pole tip has been removed.

FIG. 5 illustrates a subsequent phase in the fabrication process after the one illustrated in FIG. 4. At this point the P2 tip 47 has been etched away leaving the resistor 37 covered by the gap layer 49. If P2 is formed from permalloy as typically is the case, using this method it is important that the resistor material survive exposure to the etchant used to remove the permalloy.

The leads for voltage and current 33a, 33b, 35a, 35b are preferably gold or copper and can conveniently be deposited at the same time as other conductive features on the heads such as, for example, the coil.

The P2 pole tip 47 is formed over the resistor 37 in exactly the same way that they are formed for the transducers (not shown). The resistor 37 itself is opened to all of the process steps which affect P2b. For example, if conventional P1 notching and P2 trimming are used, then the resistor 37 should be subjected to these process steps.

After the P2 processing is complete vias (not shown) to the resistor leads/pads 33a, 33b, 35a, 35b are formed through the protective layer of alumina (not shown). If the write gap is too thin to provide protection then thicker alumina will need to be lifted off of the top of the resistor.

Figure 6:
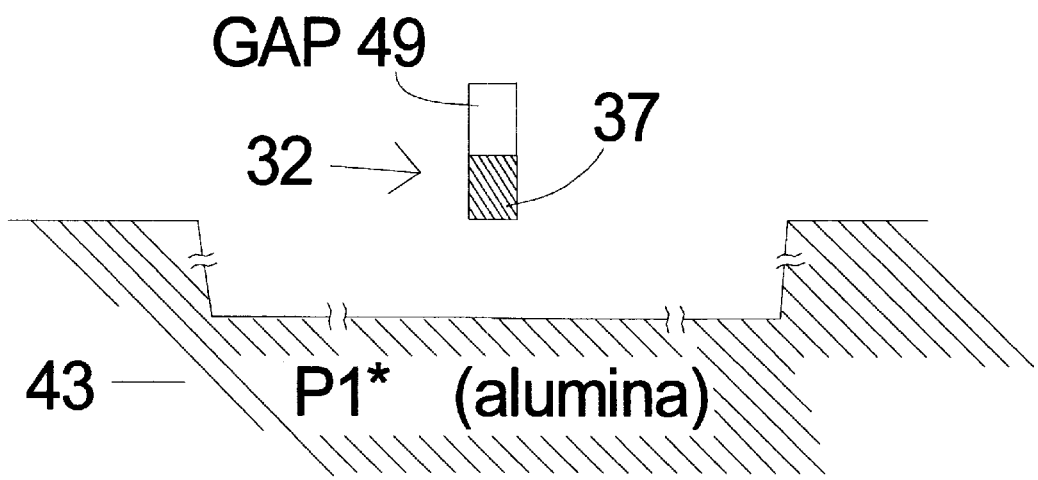
FIG. 6 illustrates a section of the layers during the fabrication process of an alternative embodiment of the metrology structure according to the invention, after the pole tip and the P1* layer has been etched away leaving the central portion of the resistive material as a bridge.

An alternative embodiment 32 of the metrology structure will now be described. In this embodiment the P1 material is selected, for example, as a metal which is etched by the etchant used to remove the P2 field during standard processing. The results are shown in FIG. 6. The surface of P1* and the sides of the pedestal of P1* material are etched away leaving an unsupported column of resistive material 37 bridging between the unmilled ends (not shown). A material such as tantalum has sufficient strength to be self-supporting long enough to serve the purpose. The advantage of this embodiment is that it provides high visual contrast when the metrology structures are viewed.

The invention has been described in specific embodiments, but other variations and embodiments will be apparent to those skilled in the art which will nevertheless be within the spirit and scope of the invention.

What is claimed is:

1. A method of fabricating a plurality of magnetic transducers on a wafer comprising the steps of:
   forming a plurality of pads of resistive material on the wafer at predetermined positions, the pads having a first shape;
   forming conductive leads in electrical contact with the pads of resistive material;
   forming a component of the magnetic transducers over at least a selected first subset of the pads of resistive material;
   trimming the pads of resistive material to form metrology resistors having a second shape corresponding to a dimension of the component formed thereon; and
   measuring a resistance of at least one of the metrology resistors to ascertain the dimension of the component.

2. The method of claim 1 wherein the component is a pole piece tip and the dimension is a width of the pole piece tip.

3. The method of claim 2 wherein the trimming step further comprises ion milling using a selected area of the pole piece tip as a mask to preserve resistive material under the pole piece tip while removing resistive material not under the selected area of the pole piece tip.

4. The method of claim 1 further comprising the steps of: forming at least one sheet resistor by preserving a selected second subset of the pads of resistive material in the first shape; measuring a resistance of the sheet resistor; determining a sheet resistance using the resistance of the sheet resistor and using the sheet resistance to convert the resistance of at least one of the metrology resistors into a measure of the dimension.

5. The method of claim 1 further comprising the prepatory step of forming a first place-holding layer on locations on the wafer at the predetermined positions selected for the pads of resistive material, the first place-holding layer being coplanar with a first pole piece layer on the magnetic transducers.

6. The method of claim 5 further comprising the step of:
   depositing a gap layer on the magnetic transducers and over the pads of resistive material prior to the step of forming the component so that the gap layer separates the pads of resistive material from the component.

7. The method of claim 6, wherein the component is a pole piece tip, further comprising the step of:
   removing the pole piece tips from the gap layer over the pads of resistive material after the trimming step.

8. The method of claim 7, the step of removing the pole piece tips further comprising the step of applying an etchant to the wafer which removes the pole piece tips and simultaneously removes excess ferromagnetic material around the pole pieces on the magnetic transducers.

9. The method of claim 1 wherein the component of the magnetic transducers is a pole piece tip, and the step of trimming the pads of resistive material further comprising the step of narrowing the pads of resistive material in a selected area to correspond to a width of the pole piece tip using the pole piece tip as a mask.

10. A wafer comprising:
    a plurality of at least partially completed magnetic transducers arrayed on the wafer; and
    a plurality of metrology structures arrayed on the wafer interspersed with the magnetic transducers, the metrology structures including a pad of resistive material trimmed to correspond to at least one dimension of a component of the magnetic transducers and having a resistance proportional to the dimension of the component.

11. The wafer of claim 10 further comprising a plurality of control structures arrayed on the wafer having an untrimmed pad of resistive material.

12. The wafer of claim 10 wherein each metrology structure further comprises four conductive pads for a four point probe which allow the resistance to be measured.

13. The wafer of claim 10 wherein the component is a pole piece tip and the dimension is a width of a bottom of the pole piece tip.

14. The wafer of claim 13, the pads of resistive material in the metrology structures having a narrow central portion between two wider ends, the narrow central portion having a width equal to the width of the bottom of the pole piece tip.

15. The wafer of claim 14 wherein the narrow central portion of the metrology structures is a bridge of material where an underlying layer has been etched away.

16. The wafer of claim 10 wherein the metrology structures further comprise a place-holding layer under the pads of resistive material, the place-holding layer being coplanar with a first pole piece layer on the magnetic transducers.

17. The wafer of claim 10 wherein the pads of resistive material include tantalum.

18. A method of manufacturing magnetic transducers on a wafer comprising:
    forming a plurality of partially completed magnetic transducers arrayed on the wafer; and
    forming a plurality of pads of resistive material interspersed among the partially completed magnetic transducers, the pads having a first shape and being connected to electrically conductive leads;
    forming a pole piece tip over one or more selected pads of resistive material in parallel with a pole piece tip on an adjacent partially completed magnetic transducer; and
    trimming the pad of resistive material to have a second shape by ion milling using a predetermined area of the pole piece tip as a mask to protect the resistive material under it from being removed, the ion milling continuing until a selected area of the pad of resistive material has a width equal to a width of a bottom surface of the pole piece tip over the pad of resistive material; and
    determining the width of the bottom surface of the pole piece tip over the pad of resistive material using a measured resistance obtained by placing probes in contact with the electrically conductive leads.

19. The method of claim 18 further comprising the steps of preserving a plurality of pads of resistive material having the first shape; determining a sheet resistance by measuring a resistance of the pad of resistive material having the first shape and using the sheet resistance in the step of determining the width of the bottom surface of the pole piece tip.

20. The method of claim 18 further comprising the step of forming four conductive pads for a four point probe for each pad of resistive material.

21. The method of claim 18 further comprising a prepatory step of depositing an electrically insulating place-holding layer where the pads of resistive material will be formed, the place-holding layer being coplanar with a first pole piece layer on the partially completed magnetic transducers.

22. The method of claim 21 further comprising the step of etching away material in the place-holding layer under the selected area of the pad of resistive material leaving the selected area of the pad of resistive material as a self-supporting bridge.

* * * * *